(12) United States Patent
Bensussan et al.

(10) Patent No.: US 9,386,844 B1
(45) Date of Patent: Jul. 12, 2016

(54) COMPUTER KEYBOARD HOLDER

(71) Applicant: Premier Manufacturing Group, Inc., Shelton, CT (US)

(72) Inventors: Bernard Bensussan, Monroe, CT (US); David Black, Orange, CT (US); Gregory Russell, Oxford, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 0 days.

(21) Appl. No.: 14/791,170

(22) Filed: Jul. 2, 2015

(51) Int. Cl.
*A47B 97/04* (2006.01)
*A47B 21/04* (2006.01)
*A47B 96/02* (2006.01)

(52) U.S. Cl.
CPC ............... *A47B 21/04* (2013.01); *A47B 96/02* (2013.01); *A47B 97/04* (2013.01)

(58) Field of Classification Search
CPC ...... A47B 23/042; A47B 97/04; A47B 96/02; A47B 21/04; A47F 5/112
USPC .......... 248/459, 450, 447.1, 441.1, 451, 452, 248/453, 460; 108/42, 11, 152
See application file for complete search history.

(56) References Cited

U.S. PATENT DOCUMENTS

| | | | | | |
|---|---|---|---|---|---|
| 456,089 | A | * | 7/1891 | Harrison | A47B 23/042 190/10 |
| 873,286 | A | * | 12/1907 | Barrows | A47B 23/042 248/452 |
| 991,616 | A | * | 5/1911 | Hazard | A47F 5/112 248/450 |
| 1,134,802 | A | * | 4/1915 | Agar | A47B 23/042 248/459 |
| 1,247,033 | A | * | 11/1917 | Swartz | A47B 23/042 211/50 |
| 1,263,761 | A | * | 4/1918 | Haslam | A47B 23/042 248/453 |
| 1,807,517 | A | * | 5/1931 | Erlendson | A47B 97/00 248/300 |
| 2,003,482 | A | * | 6/1935 | Fancher | A47B 97/04 248/447.1 |
| 2,193,991 | A | * | 3/1940 | Treacy | B42D 5/005 248/206.1 |
| 2,402,930 | A | * | 6/1946 | Swearngin | A47B 23/04 248/453 |
| 3,885,762 | A | * | 5/1975 | Sebastiani | G12B 9/08 248/346.07 |
| 3,897,037 | A | * | 7/1975 | Johnson | A47B 23/042 248/452 |
| 4,033,652 | A | * | 7/1977 | O'Brien | A47B 23/02 248/447.1 |

(Continued)

OTHER PUBLICATIONS

Kendall Howard 1U Stationary Keyboard Tray Jun. 15, 2006.
(Continued)

*Primary Examiner* — Kimberly Wood
(74) *Attorney, Agent, or Firm* — Raymond A. Nuzzo

(57) ABSTRACT

A computer keyboard holder has a wall angulated at a predetermined angle. A built-in shelf is offset from the front side of the wall and has a horizontal base that is angulated from the wall. The horizontal base has a top surface for storing objects. The built-in shelf has a back that is perpendicular to the base and a pair of triangular shaped sidewalls located such that the top surface is between the sidewalls. A bracket extends outwardly from a bottom edge of the wall to receive a portion of a lengthwise edge of a keyboard. A keyboard is stored on the keyboard holder by positioning a portion of the lengthwise edge of the keyboard on the bracket and leaning the keyboard against the front side of the wall. When a keyboard is stored on the keyboard holder, the keyboard obscures the view of the built-in shelf.

20 Claims, 8 Drawing Sheets

(56) References Cited

U.S. PATENT DOCUMENTS

| | | | |
|---|---|---|---|
| 4,269,381 A * | 5/1981 | Harms | A47B 23/02 211/181.1 |
| 7,216,789 B2 * | 5/2007 | Caradimos | E60R 11/0252 108/44 |
| 7,922,267 B2 | 4/2011 | Gevaert | |
| 2003/0218110 A1 * | 11/2003 | Burgess | E04B 5/12 248/220.1 |
| 2004/0089783 A1 | 5/2004 | Klimke | |
| 2004/0149872 A1 | 8/2004 | Giles | |
| 2005/0045788 A1 | 3/2005 | Mangeau | |
| 2005/0115475 A1 | 6/2005 | Lin | |
| 2006/0261223 A1 * | 11/2006 | Orndorff, II | E04B 2/7409 248/220.1 |
| 2010/0090857 A1 * | 4/2010 | Varieur | G08B 5/38 340/693.9 |
| 2012/0268878 A1 | 10/2012 | Smith | |

OTHER PUBLICATIONS

Rack Solutions Full Keyboard Wall Mount 2014.
RackSonic Rack Mount Keyboard Shelf 2012.

* cited by examiner

COMPUTER KEYBOARD HOLDER

STATEMENT OF GOVERNMENT INTEREST

Not applicable.

CROSS REFERENCE TO OTHER PATENT APPLICATIONS

Not applicable.

TECHNICAL FIELD

The present invention generally relates to a computer keyboard holder.

BACKGROUND

Devices for storing computer keyboards are disclosed in U.S. Pat. No. 7,922,267, entitled "Movable Monitor And Keyboard Storage System For A Work Surface", U.S. Patent Application Publication No. 2005/0115475, entitled "Keyboard Carrier", and U.S. Patent Application Publication No. 2012/0268878, entitled "Mountable Device".

SUMMARY

In some embodiments, the invention is directed to a computer keyboard holder that comprises a wall that is angulated at a predetermined angle. The wall has a front side and a rear side. The computer keyboard holder further comprises a built-in shelf that is offset from the front side of the wall and has a horizontal base section that is angulated from the wall. The horizontal base section has a top surface for storing objects. The built-in shelf has a back section that is perpendicular to the base section and a pair of triangular shaped sidewalls located such that the top surface is between the sidewalls. A bracket extends outwardly from a bottom edge of the wall to receive a portion of a lengthwise edge of a keyboard. A computer keyboard is stored on the keyboard holder by positioning the lengthwise edge of the keyboard on the bracket and leaning the keyboard against the front side of the wall. When a computer keyboard is stored on the keyboard holder, the computer keyboard obscures the view of the built-in shelf.

In some embodiments, the invention is directed to a computer keyboard holder that comprises a wall that is angulated at a predetermined angle θ. The wall has a bottom edge portion, a top edge portion, a front side and a rear side. The wall has a size that is generally the same as the size of a computer keyboard. The computer keyboard holder further comprises a built-in shelf portion that is offset from the front side of the wall. The built-in shelf portion has a substantially horizontal base section that is angulated from the wall by an acute angle. The base section has a surface for storing objects, a back section that is perpendicular to the base section, and a pair of triangular shaped sidewalls located such that the surface of the base section is between the triangular shaped sidewalls. The triangular shaped sidewalls are perpendicular to the base section. Each triangular shaped sidewall has a perimeter that comprises a first portion that is contiguous with the base section, a second portion that is contiguous with the back section and perpendicular to the first portion and a third portion that is contiguous with the wall and is angulated from the first portion by the predetermined angle θ. The computer keyboard holder further comprises a plate member that is attached to the top edge portion of the wall and extends downward such that the plate member is angulated from the rear side of the wall by an angle that is less than 180°. The plate member is configured to allow the computer keyboard holder to be attached to a structure. The computer keyboard holder further comprises at least one bracket that extends outwardly from the bottom edge portion of the wall. The bracket comprises a first section that is generally perpendicular to the front side of the wall and configured to receive a portion of the lengthwise end of a computer keyboard. A computer keyboard can be held by the computer keyboard holder by positioning a portion of the lengthwise edge of the computer keyboard on the bracket and leaning the computer keyboard against the front side of the wall. The predetermined angle θ of the wall keeps the computer keyboard leaning against the front side of the wall

DETAILED DESCRIPTION

Figure 1:
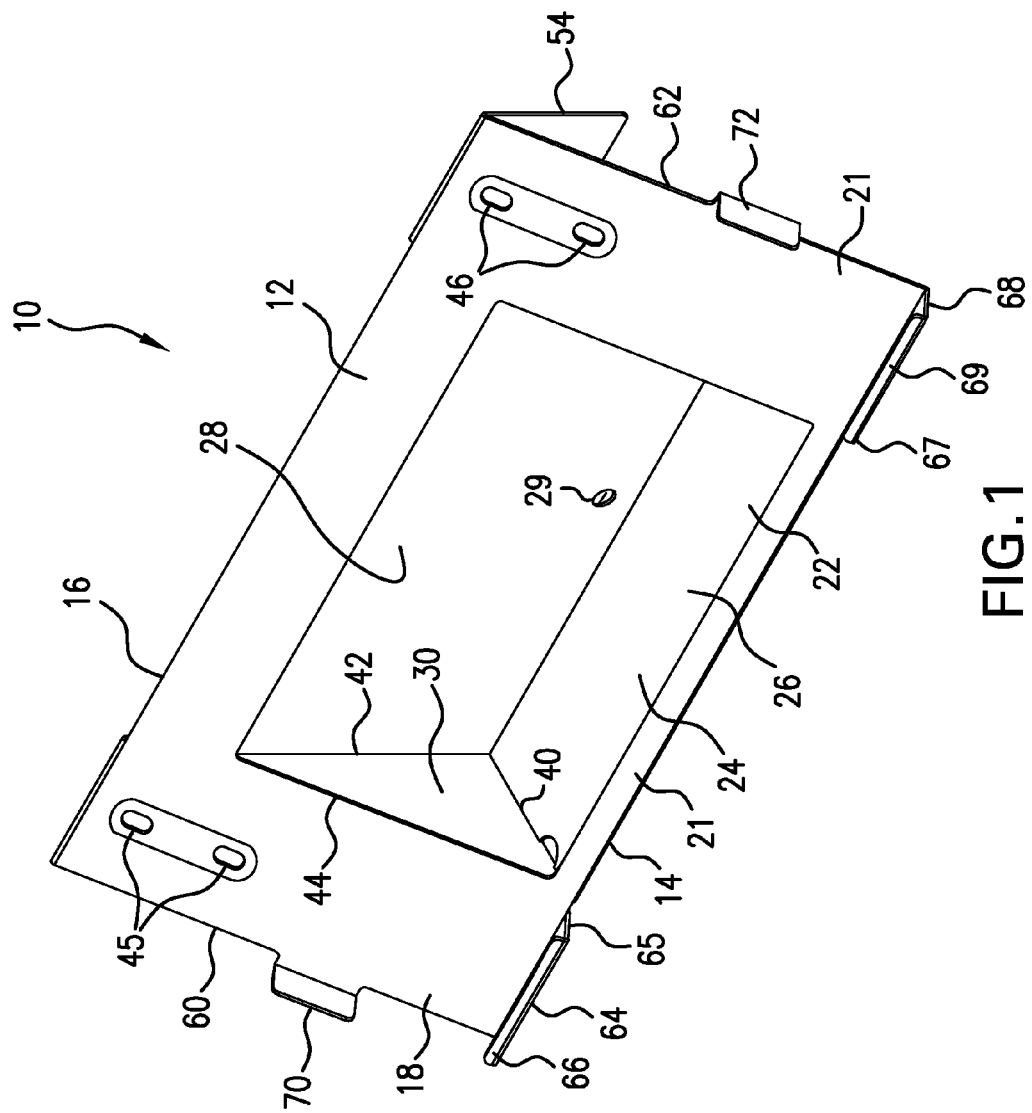
FIG. 1 is a perspective view of a computer keyboard holder in accordance with one embodiment of the invention.
Figure 2:
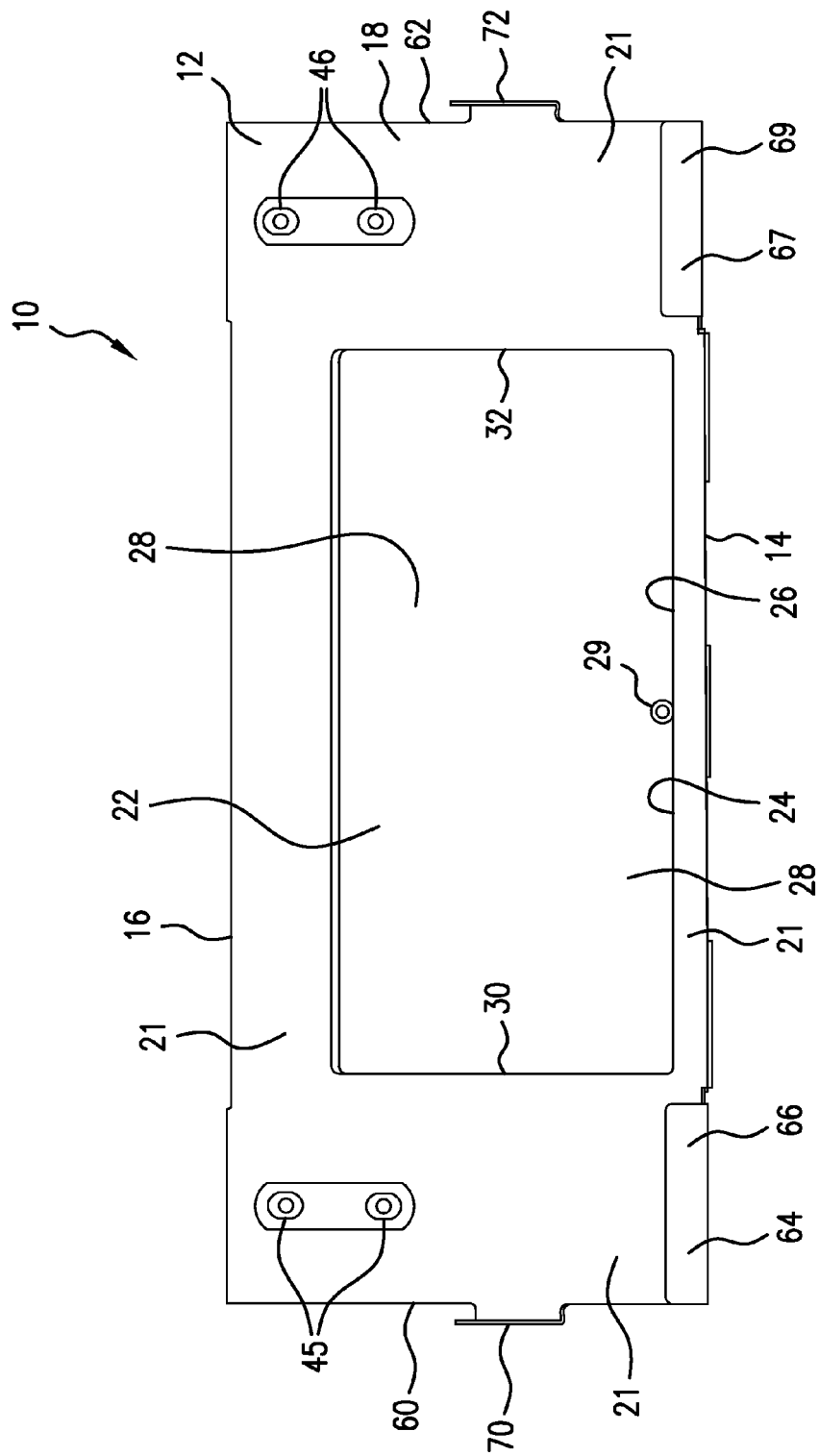
FIG. 2 is a front view of the computer keyboard holder.
Figure 4:
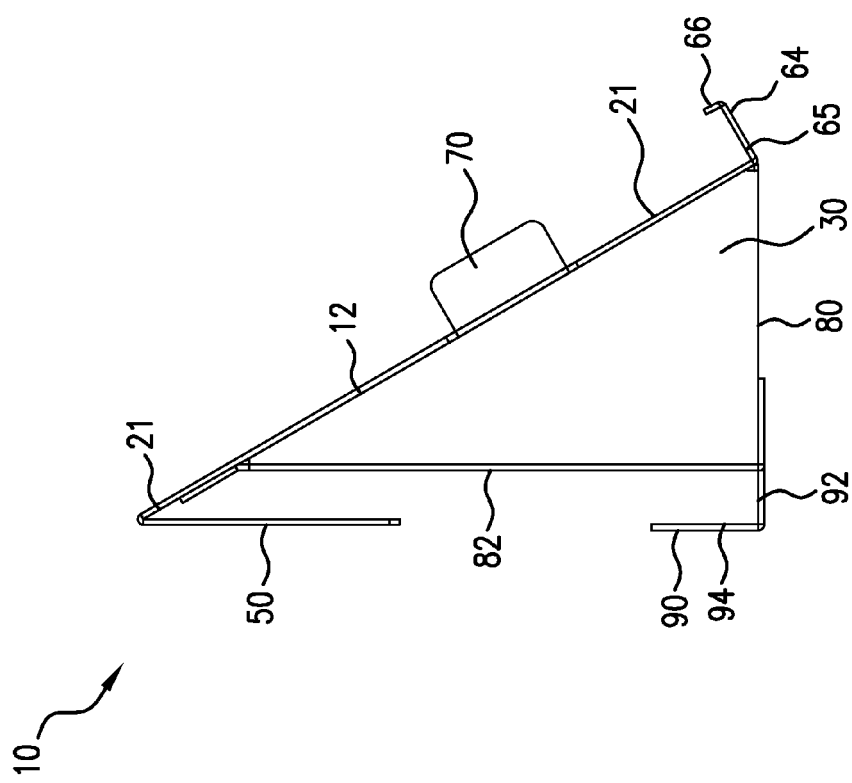
FIG. 4 is a view of the left side of the computer keyboard holder, the view of the right side of the computer keyboard holder being essentially the same.
Figure 5:
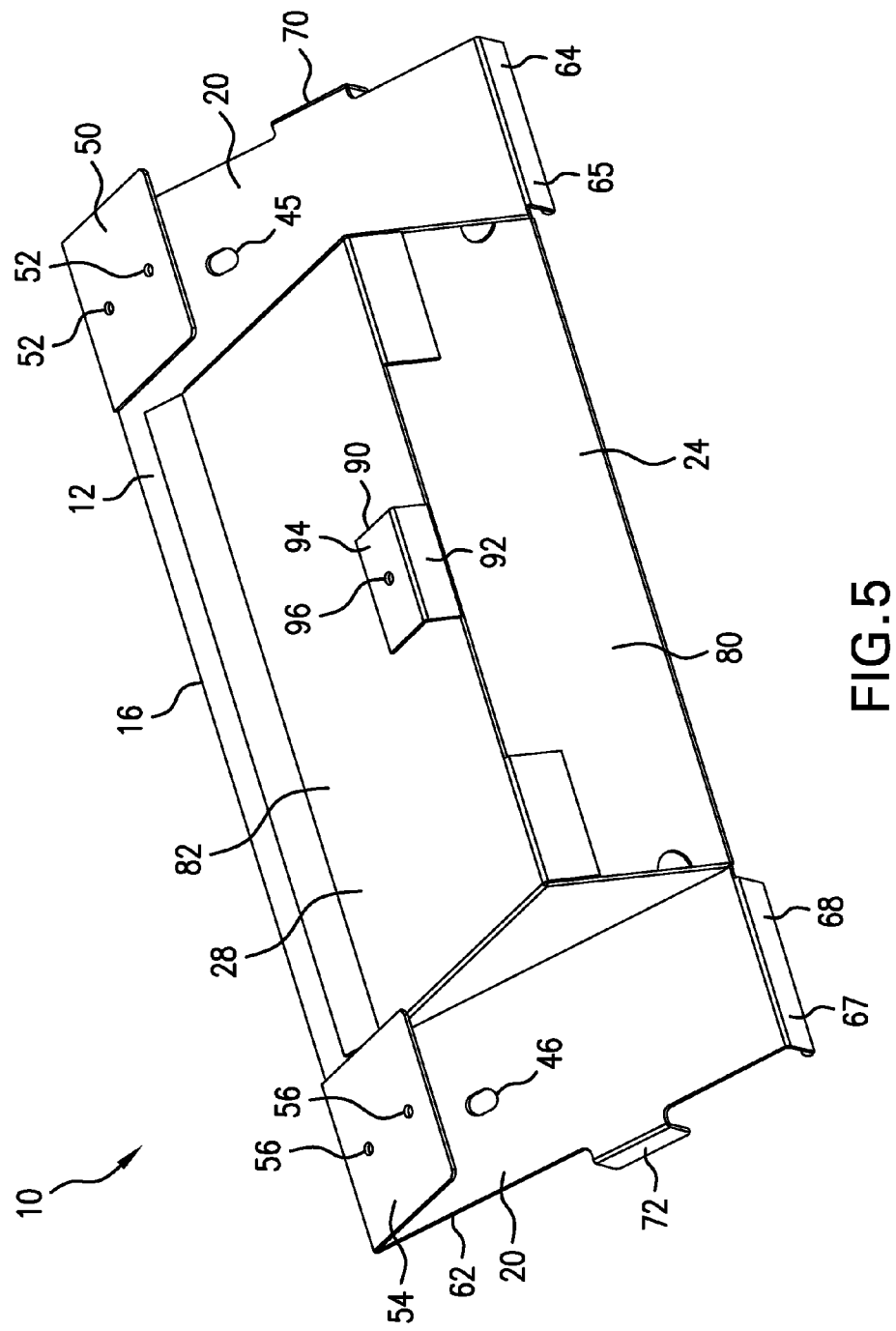
FIG. 5 is a perspective view of the rear of the computer keyboard holder.
Figure 6:
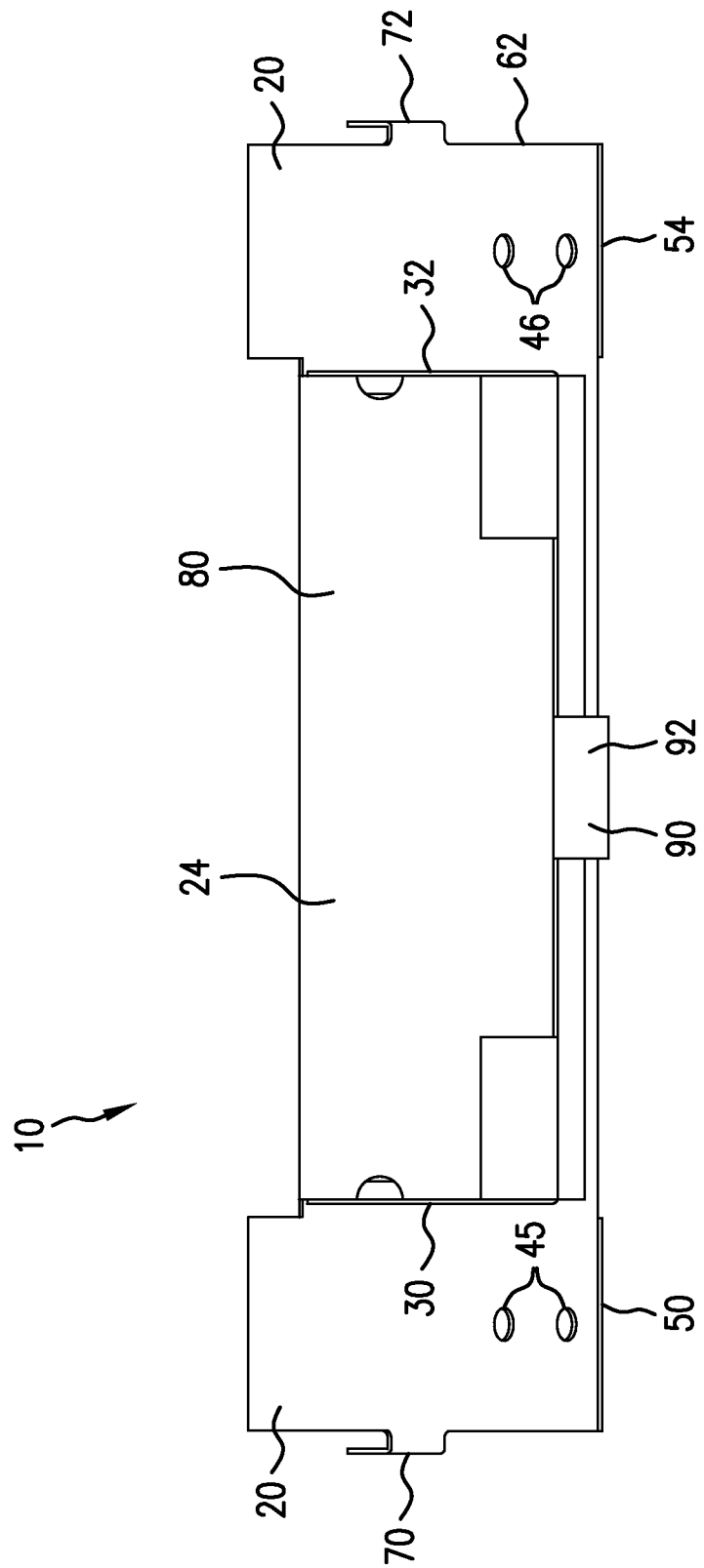
FIG. 6 is a bottom view of the keyboard holder.

Referring to FIGS. 1, 2 and 4, there is computer keyboard holder 10 in accordance with one embodiment of the invention. Computer keyboard holder 10 comprises wall 12 that is angulated at a predetermined angle θ (see FIG. 8). Wall 12 has bottom edge portion 14, top edge portion 16, front side 18 and rear side 20. Front side 18 has surface 21. In one embodiment, wall 12 has a size that is generally the same as the size of a computer keyboard. Keyboard holder 10 further comprises built-in shelf portion 22 that is offset from front side 18 of wall 12. Built-in shelf portion 22 has a substantially horizontal base section 24 that is angulated from wall 12 by an acute angle. Base section 24 has top surface 26 for storing objects such a computer mouse, remote control device, etc. Built-in shelf portion 22 further comprises back section 28 that is perpendicular to base section 24, and a pair of triangular shaped sidewalls 30 and 32 that are located such that surface 26 is between the triangular shaped sidewalls 30 and 32. Triangular shaped sidewalls 30 and 32 are perpendicular to base section 24. Triangular shaped sidewall 30 has a perimeter that comprises first perimeter portion 40 that is contiguous with base section 24, second perimeter portion 42 that is contiguous with back section 28 and perpendicular to first perimeter portion 40 and third perimeter portion 44 that is contiguous with wall 12 and is angulated at predetermined angle θ from first perimeter portion 40. Similarly, triangular shaped sidewall 32 also has a perimeter that comprises a first perimeter portion that is contiguous with base section 24, a second perimeter portion that is contiguous with back section 28 and perpendicular to the first perimeter portion and a third perimeter portion that is contiguous with wall 12 and is angulated at predetermined angle θ from the first perimeter portion. Back section 28 of built-in shelf portion 22 has opening 29 for receiving a fastening device to allow computer keyboard holder 10 to be attached to a structure such as a wall, column, etc. As shown in FIGS. 1 and 2, surface 21 of front side 18 extends about built-in shelf portion 22. Wall 12 includes a first plurality of openings 45 and a second plurality of openings 46. The purpose of openings 45 and 46 is discussed in the ensuing description.

Figure 3:
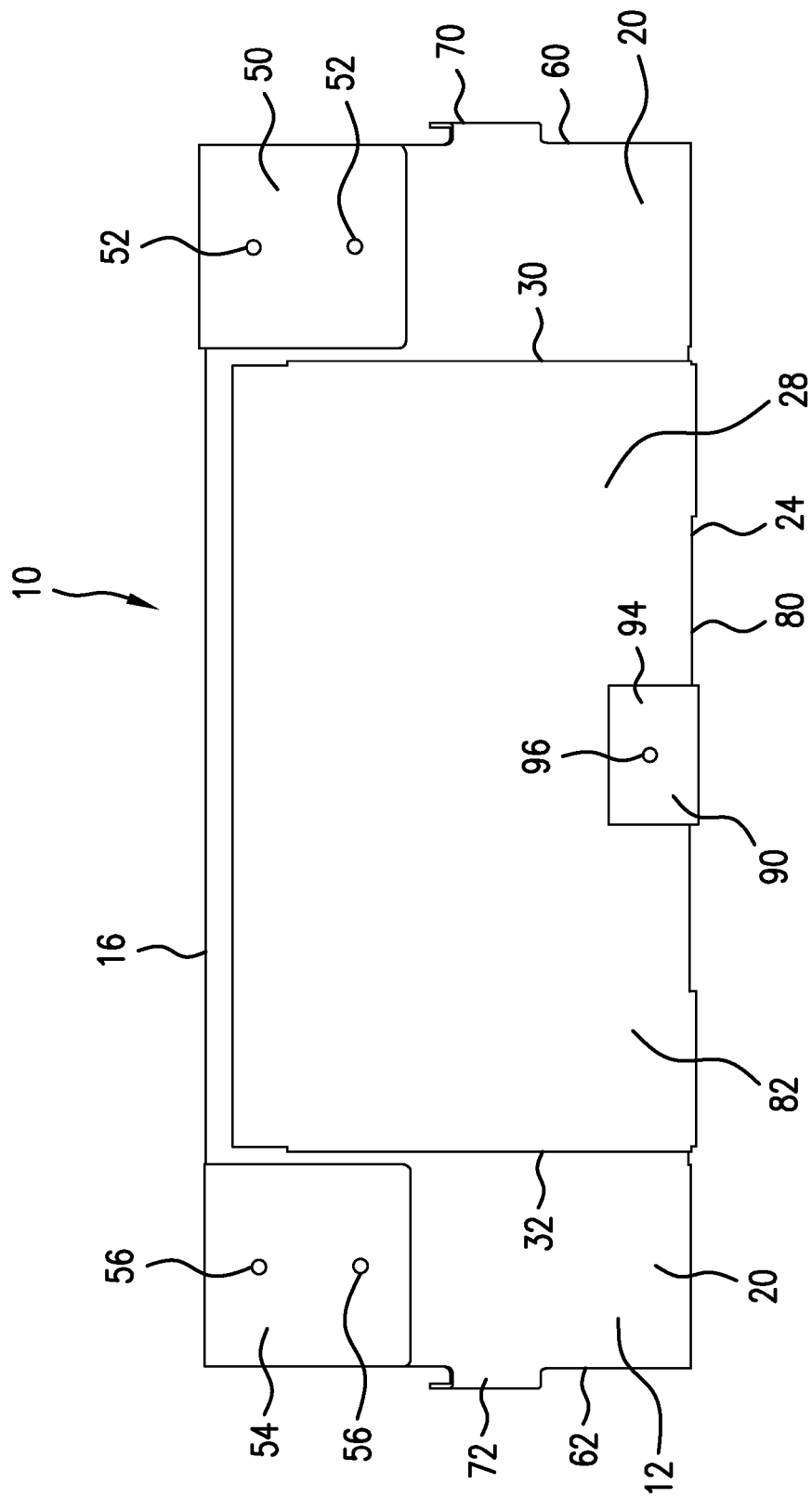
FIG. 3 is a rear view of the computer keyboard holder.

Referring to FIGS. 1, 3, 5 and 8, keyboard holder 10 further comprises plate member 50 that is attached to top edge portion 16 of wall 12 and extends downward such that plate member 50 is angulated by angle Ø from rear side 20 of wall 12. In one embodiment, angle Ø is less than 90°. In another embodiment, angle Ø is an obtuse angle. Plate member 50 is configured to allow keyboard holder 10 to be attached to a wall, column, article of furniture or other structure. Specifically, plate member 50 has at least one opening 52 therein which is sized to receive a fastener, such as a screw or nail, to allow plate member 50, and thus keyboard holder 10, to be attached to a structure such as a wall, column, etc. In one embodiment, there is a plurality of openings 52 in plate member 50. Each opening 52 is aligned with a corresponding opening 45 in wall 12. Such a configuration allows a screw, nail or other fastening member to be inserted through each opening 45 and corresponding opening 52 in order to attach the keyboard holder 10 to a structure, such as a wall, column, etc. Keyboard holder 10 includes an additional plate member 54. Plate member 54 includes openings 56. Each opening 56 is aligned with a corresponding opening 46 in wall 12. Such a configuration allows a screw, nail or other fastening member to be inserted through each opening 46 and corresponding opening 56 in order to attach the keyboard holder 10 to a structure, such as a wall, column, etc. As shown in FIGS. 1 and 3, plate member 50 is positioned in proximity to side edge 60 of wall 12 and plate member 54 is positioned in proximity to side edge 62 of wall 12.

Referring to FIGS. 1, 2 and 4, keyboard holder 10 further comprises at least one bracket 64 extending outwardly from bottom edge portion 14 of wall 12. Bracket 64 is sized to receive a portion of a lengthwise edge of a computer keyboard. Bracket 64 comprises first section 65 that is substantially perpendicular to wall 12 and second section 66 that is angulated upward and perpendicular to first section 65 such that bracket 64 has a substantial "L" shape wherein second section 66 prevents the computer keyboard from sliding off of first section 65. Keyboard holder 10 further includes bracket 67. Bracket 67 comprises first section 68 that is substantially perpendicular to wall 12 and second section 69 that is angulated upward and perpendicular to first section 68 such that bracket 67 has a substantial "L" shape wherein second section 69 prevents the computer keyboard from sliding off of first section 68. A computer keyboard can be stored on keyboard holder 10 by positioning portions of the lengthwise edge of the computer keyboard on brackets 64 and 67 and leaning the computer keyboard against front side 18 of wall 12. The predetermined angle θ of wall 12 maintains physical contact between the rear side of the computer keyboard and front side 18 of wall 12.

Referring to FIGS. 1, 2 and 3, keyboard holder 10 further comprises a pair of arm members 70 and 72. Arm member 70 extends from side edge 60 of wall 12 and is angulated from front side 18 of wall 12 by an angle that is between about 80° and 100°. Arm member 72 extends from side edge 62 of wall 12 and is angulated from front side 18 of wall 12 by an angle that is between about 80° and 100°. In one embodiment, each arm member 70 and 72 is substantially perpendicular to front side 18 of wall 12.

Referring to FIGS. 3, 4, 5 and 6, base section 24 of built-in shelf portion 22 has bottom side 80 and back section 28 has rear side 82. Keyboard holder 10 further comprises support bracket 90. Bracket 90 comprises substantially horizontal section 92 that is attached to bottom side 80 of base section 24 and upstanding vertical section 94 that is attached to the substantially horizontal section 92. Upstanding vertical section 94 is substantially perpendicular to substantially horizontal section 92 and is spaced apart from rear side 82 of back section 28. Upstanding vertical section 94 has an opening 96 for receiving a fastening device, such as a screw. Opening 29 in back section 28 of built-in shelf portion 22 is aligned with opening 96. Such a configuration allows a fastening device, such as a screw or nail, to be inserted through opening 29 and opening 96 in order to attach or mount keyboard holder 10 to a structure such as a wall, column, article of furniture, etc.

In one embodiment, keyboard holder 10 includes relatively soft pads or cushions that can be adhered to front side 18 of wall 12, portions 65 and 68 of brackets 64 and 67, respectively, and arm members 70 and 72 in order to prevent the computer keyboard from being scratched and to create a degree of friction that prevents movement of a computer keyboard when the keyboard is positioned on keyboard holder 10. For example, if fasteners are inserted through openings 45 in wall 12 and corresponding openings 52 in plate member 50, a cushion or pad can be adhered to wall 12 so as to cover the protruding heads of the aforementioned fasteners so as to prevent the fasteners from scratching the computer keyboard. Similarly, if fasteners are inserted through openings 46 in wall 12 and corresponding openings 56 in plate member 54, a cushion or pad can be adhered to wall 12 so as to cover the protruding heads of the fasteners to prevent the fasteners from scratching the computer keyboard. The cushions or pads can be fabricated from any suitable material, such as foam, rubber, Velcro™, fabric, etc.

Figure 7:
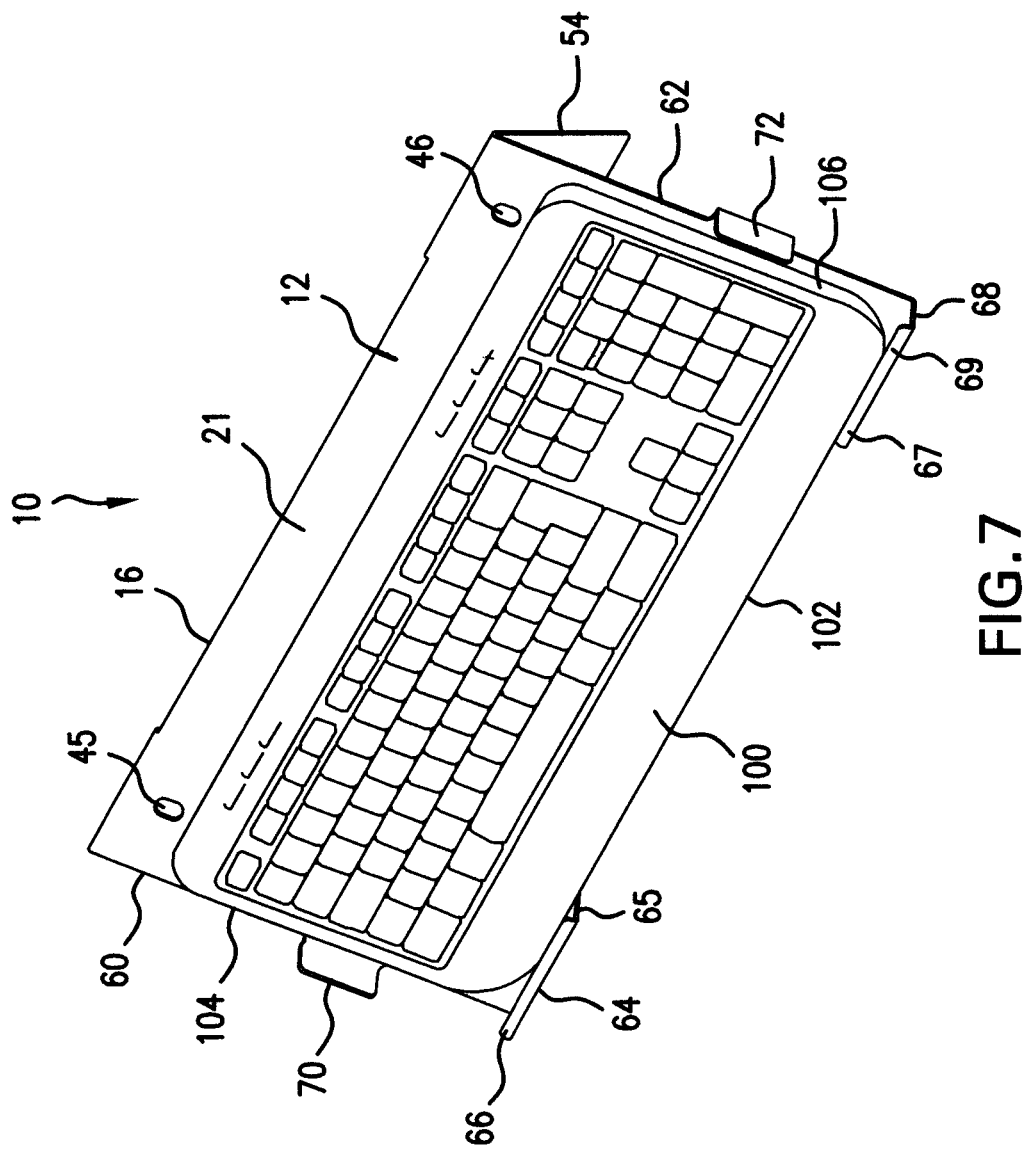
FIG. 7 is a perspective view of a computer keyboard positioned on the computer keyboard holder.
Figure 8:
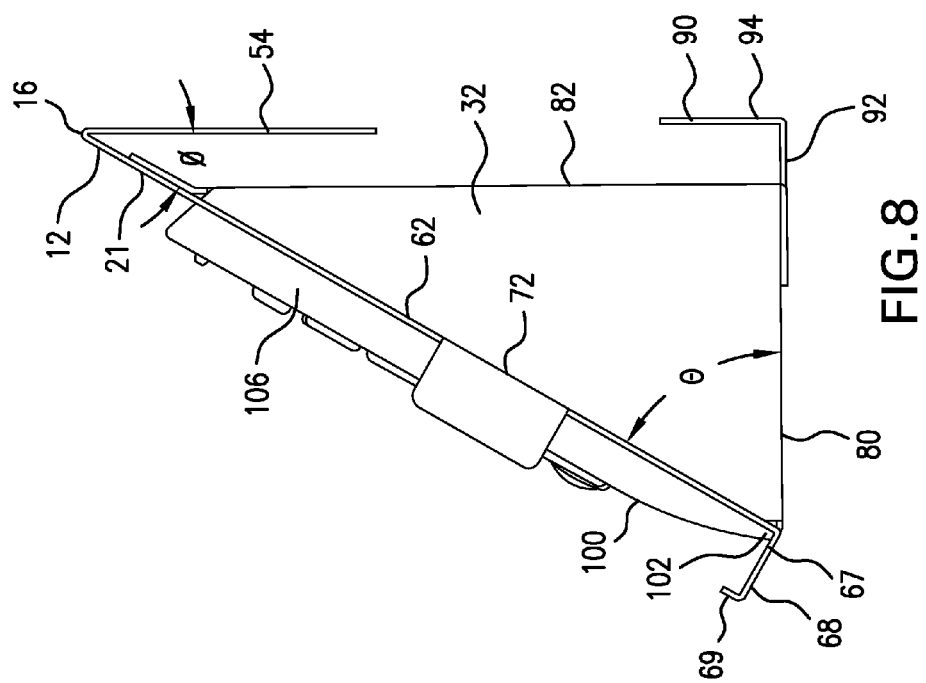
FIG. 8 is side view of the computer keyboard positioned on the computer keyboard holder.

Referring to FIGS. 7 and 8, computer keyboard 100 is positioned on keyboard holder 10. Computer keyboard 100 has lengthwise edge portion 102 and side portions 104 and 106. Portions of lengthwise edge portion 102 are supported by brackets 64 and 67. The rear side of computer keyboard 100 leans against front side 18 of wall 12 as a result of the angulation of wall 12. Section 66 of bracket 64 and section 69 of bracket 67 prevent computer keyboard 100 from sliding out of brackets 64 and 67, respectively. Computer keyboard 100 obscures the view of built-in shelf 22.

Any suitable material may be used to fabricate computer keyboard holder 10. Examples of such materials are steel, stainless steel, iron, copper, brass, aluminum, plastic, PVC (polyvinyl chloride), rubber, resin and composites.

In another embodiment, brackets 64 and 67 are replaced by a single bracket that is centrally located on bottom edge portion 14 of wall 12. In such an embodiment, the centrally located bracket has the same structure as brackets 64 and 67 but has a relatively longer length so as to receive a relatively larger portion of the lengthwise edge 102 of the keyboard 100.

In an alternate embodiment, the built-in shelf portion is configured so that the base section is angulated with respect to the wall to a predetermined angular degree such that the base section slopes downward toward the back section of the built-in shelf. Such a configuration results in the triangular shaped sidewalls having a shape that is still triangular but yet different than the triangular shape shown in FIGS. 1, 4 and 8.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer keyboard holder comprising a wall angulated at a predetermined angle θ, the wall having a bottom edge portion, a top edge portion, a front side for receiving a computer keyboard and a rear side, the computer keyboard holder further comprising a built-in shelf portion that is offset from the front side of the wall, the built-in shelf portion having a substantially horizontal base section that is angulated from the wall by an acute angle, wherein the base section has a surface for storing objects and a bottom side, the built-in shelf portion further comprising a back section that is perpendicular to the base section and which has a rear side, and a pair of triangular shaped sidewalls located such that the surface of the base section is between the triangular shaped sidewalls, each triangular shaped sidewall being perpendicular to the base section and having a perimeter that comprises a first portion that is contiguous with the base section, a second portion that is contiguous with the back section and perpendicular to the first portion and a third portion that is contiguous with the wall and is angulated from the first portion by the predetermined angle θ, the computer keyboard further comprising a support bracket having a substantially horizontal section attached to the bottom side of the base section and an upstanding vertical section attached to the horizontal section, wherein the upstanding vertical section is generally perpendicular to the substantially horizontal section and is spaced apart from the rear side of the back section of the built-in shelf, the upstanding vertical section having an opening for receiving a fastening device, the computer keyboard holder further comprising a plate member that is attached to the top edge portion of the wall and extends downward such that the plate member is angulated from the rear side of the wall by an angle that is less than 180°, wherein the plate member is configured to allow the computer keyboard holder to be attached to a structure, the computer keyboard holder further comprising at least one bracket extending outwardly from the bottom edge portion of the wall and having a first section that is generally perpendicular to the front side of the wall and configured to receive a portion of the lengthwise end of a computer keyboard, wherein a computer keyboard can be held by the computer keyboard holder by positioning a portion of the lengthwise edge of the computer keyboard on the at least one bracket and leaning the computer keyboard against the front side of the wall, wherein the predetermined angle θ of the wall maintains physical contact between the computer keyboard and the front side of the wall.

2. The computer keyboard holder according to claim 1 wherein the at least one bracket comprises a second section that is angulated upward and generally perpendicular to the first section such that bracket has a substantial "L" shape, wherein the second section prevents the computer keyboard from sliding off of the first section.

3. The computer keyboard holder according to claim 1 wherein the at least one bracket comprises a plurality of brackets.

4. The computer keyboard holder according to claim 1 wherein the at least one plate member comprises a plurality of plate members.

5. The computer keyboard holder according to claim 4 wherein the wall has a pair of side edges and each plate member is in proximity to a corresponding side edge.

6. The computer keyboard holder according to claim 1 wherein the at least one plate member has at least one opening for receiving a fastening device.

7. The computer keyboard holder according to claim 6 wherein the wall has at least one opening that is aligned with the opening in the at least one plate member and sized to receive a fastening device.

8. The computer keyboard holder according to claim 1 wherein the back section of the built-in shelf has an opening for receiving a fastening device.

9. The computer keyboard holder according to claim 1 wherein the front side has a surface that extends about the built-in shelf.

10. The computer keyboard holder according to claim 1 wherein the wall has a pair of side edges and the computer keyboard holder further comprises a pair of arm members, each arm member extending from a corresponding side edge of the wall and being angulated from the front side of the wall by a degree of angulation that is between about 80° and 100°.

11. The computer keyboard holder according to claim 10 wherein each arm member is substantially perpendicular to the front side of the wall.

12. The computer keyboard holder according to claim 1 wherein the opening in the back section of the built-in shelf is aligned with the opening in the upstanding vertical section.

13. The computer keyboard holder according to claim 1 wherein the computer keyboard holder is fabricated from metal.

14. The computer keyboard holder according to claim 1 wherein the computer keyboard holder is fabricated from a material chosen from the group comprising plastic, PVC, resin, rubber and composites.

15. A computer keyboard holder comprising a wall angulated at a predetermined angle θ, the wall having a bottom edge portion, a top edge portion, a front side for receiving a computer keyboard and a rear side, the computer keyboard holder further comprising a built-in shelf portion that is offset from the front side of the wall, the built-in shelf portion comprising a horizontal base section that is angulated from the wall by an acute angle, wherein the base section has a surface for storing objects and a bottom side, the built-in shelf portion further comprising a back section that is perpendicular to the base section and which has a rear side, wherein the entire back section is perpendicular to the base section, the built-in shelf portion further comprising a pair of triangular shaped sidewalls located such that the surface of the base section is between the triangular shaped sidewalls, wherein each triangular shaped sidewall has a geometric shape that defines a scalene triangle, each triangular shaped sidewall being perpendicular to the base section and having a perimeter that comprises a first portion that is contiguous with the base section, a second portion that is contiguous with the back section and perpendicular to the first portion and a third portion that is contiguous with the wall and is angulated from the first portion by the predetermined angle θ, the computer keyboard holder further comprising a plate member that is attached to the top edge portion of the wall and extends downward such that the plate member is angulated from the rear side of the wall by an angle that is less than 180°, wherein the plate member is configured to allow the computer keyboard holder to be attached to a structure, the computer keyboard holder further comprising at least one bracket extending outwardly from the bottom edge portion of the wall and having a first section that is generally perpendicular to the front side of the wall and configured to receive a portion of the lengthwise end of a computer keyboard, wherein a computer keyboard can be held by the computer keyboard holder by positioning a portion of the lengthwise edge of the computer keyboard on the at least one bracket and leaning the computer keyboard against the front side of the wall, wherein the predetermined angle θ of the wall maintains physical contact between the computer keyboard and the front side of the wall.

16. The computer keyboard holder according to claim 15 further comprising a support bracket having a substantially horizontal section attached to the bottom side of the base section and an upstanding vertical section attached to the horizontal section, wherein the upstanding vertical section is generally perpendicular to the substantially horizontal section and is spaced apart from the rear side of the back section of the built-in shelf portion, the upstanding vertical section having an opening for receiving a fastening device.

17. The computer keyboard holder according to claim 15 further comprising pad members attached to the front side of the wall for contacting a computer keyboard when the computer keyboard is leaning against the front side of the wall.

18. The computer keyboard holder according to claim 15 further comprising a pad member attached to the at least one bracket for contacting a lengthwise end of a computer keyboard when the computer keyboard is being held by the computer keyboard holder.

19. The computer keyboard holder according to claim 15 wherein the wall has a pair of side edges and the computer keyboard holder further comprises a pair of arm members, each arm member extending from a corresponding side edge of the wall and being angulated from the front side of the wall by a degree of angulation that is between about 80° and 100°.

20. The computer keyboard holder according to claim 19 further comprising pad members attached to the arm members for contacting a computer keyboard when the computer keyboard is being held by the computer keyboard holder.

* * * * *